United States Patent
Chen

(10) Patent No.: US 7,589,912 B2
(45) Date of Patent: *Sep. 15, 2009

(54) COMPACT ZOOMABLE CAMERA DEVICE FOR PORTABLE DIGITAL ELECTRONIC DEVICES

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 310 days.

This patent is subject to a terminal disclaimer.

(21) Appl. No.: 11/377,698

(22) Filed: Mar. 16, 2006

(65) Prior Publication Data

US 2007/0071428 A1 Mar. 29, 2007

(30) Foreign Application Priority Data

Sep. 23, 2005 (CN) .................. 2005 1 0037486

(51) Int. Cl.
*G02B 15/14* (2006.01)
(52) U.S. Cl. ...................... 359/694; 359/696
(58) Field of Classification Search .................. 359/694
See application file for complete search history.

(56) References Cited

U.S. PATENT DOCUMENTS

| | | | |
|---|---|---|---|
| 2005/0006980 A1* | 1/2005 | Horst | 310/309 |
| 2005/0249487 A1* | 11/2005 | Gutierrez | 396/85 |
| 2006/0092514 A1* | 5/2006 | Koo et al. | 359/557 |
| 2006/0285841 A1* | 12/2006 | Masui et al. | 396/72 |

* cited by examiner

*Primary Examiner*—Jordan M. Schwartz
*Assistant Examiner*—James C Jones
(74) *Attorney, Agent, or Firm*—Frank R. Niranjan

(57) ABSTRACT

A compact zoomable camera device (10) for a portable digital electronic device is provided. The compact zoomable camera device includes: an optical system (100) for capturing images, an image sensor device (200) having an image sensor (220) positioned at a focal plane of the lens system for receiving the images and converting the images into electronic signals, and a microelectronic mechanism system (MEMS) micro-actuator (300). The optical system includes a lens system (110) for zooming and auto-focusing, wherein the focal plane of the lens system shifts according to the zooming or auto-focusing operation. The micro-actuator is adapted for driving the image sensor to move within a predetermined range to dynamically position the image sensor at the required focal plane of the camera device.

16 Claims, 1 Drawing Sheet

COMPACT ZOOMABLE CAMERA DEVICE FOR PORTABLE DIGITAL ELECTRONIC DEVICES

BACKGROUND OF THE PRESENT INVENTION

1. Field of the Invention

The present invention relates to a zoomable camera device and, particularly, to a zoomable camera device, driven by a (micro-electronic mechanism system) MEMS micro-actuator, the camera device may also be integrated with other portable digital electronic devices.

2. Discussion of the Related Art

In recent years portable digital electronic devices have become more and more popular, among which those equipped with integral cameras have been particularly successful. Despite this commercial success, without zooming and auto-focusing functions, integrated digital camera devices are more like toys or ornaments rather than real cameras. However, the portable digital electronic devices are usually small in size and often rely on small batteries for power. Thus, unlike conventional camera devices, the portable digital electronic devices can provide little space and power to accommodate the driving devices necessary for zooming and auto-focusing.

Therefore, a compact zoomable camera device having a compact driving device for driving a zooming or auto-focusing apparatus is desired.

SUMMARY OF THE INVENTION

A compact zoomable camera device for a portable digital electronic device is disclosed. The compact zoomable camera device includes an optical system for capturing images, an image sensor device for receiving the images and converting the images into electronic signals, and a MEMS micro-actuator for driving zoom or auto-focusing functions in the optical system. The optical system includes a lens system for zooming and auto-focusing, in that a focal plane of the lens system shifts according to the operation of the zooming or auto-focusing system. The image sensor device includes an image sensor positioned at the focal plane of the lens system, and a housing receiving the image sensor so as to protect the image sensor from contamination (e.g. by dust). The micro-actuator is designed so as to move the image sensor within a predetermined range to position the image sensor at the focal plane of the camera device during the zooming or auto-focusing operation.

An advantage of the camera device is that the camera device is small enough to be integrated into small size electronic devices, e.g., mobile phones, personal digital assistants (PDAs), portable notebook computers, or the like.

Another advantage of the camera device is that the camera device can be accurately controlled to perform zooming or auto-focusing operations.

Still another advantage of the camera device is that the camera device has low power consumption, thus zooming or auto-focusing operations can be performed without overly draining the battery.

BRIEF DESCRIPTION OF THE DRAWING

The above-mentioned and other features and advantages of the present compact zoomable camera device and its principles of operation will become more apparent and the invention will be better understood by reference to the following description of its embodiments taken in conjunction with the accompanying drawing.

Figure 1:
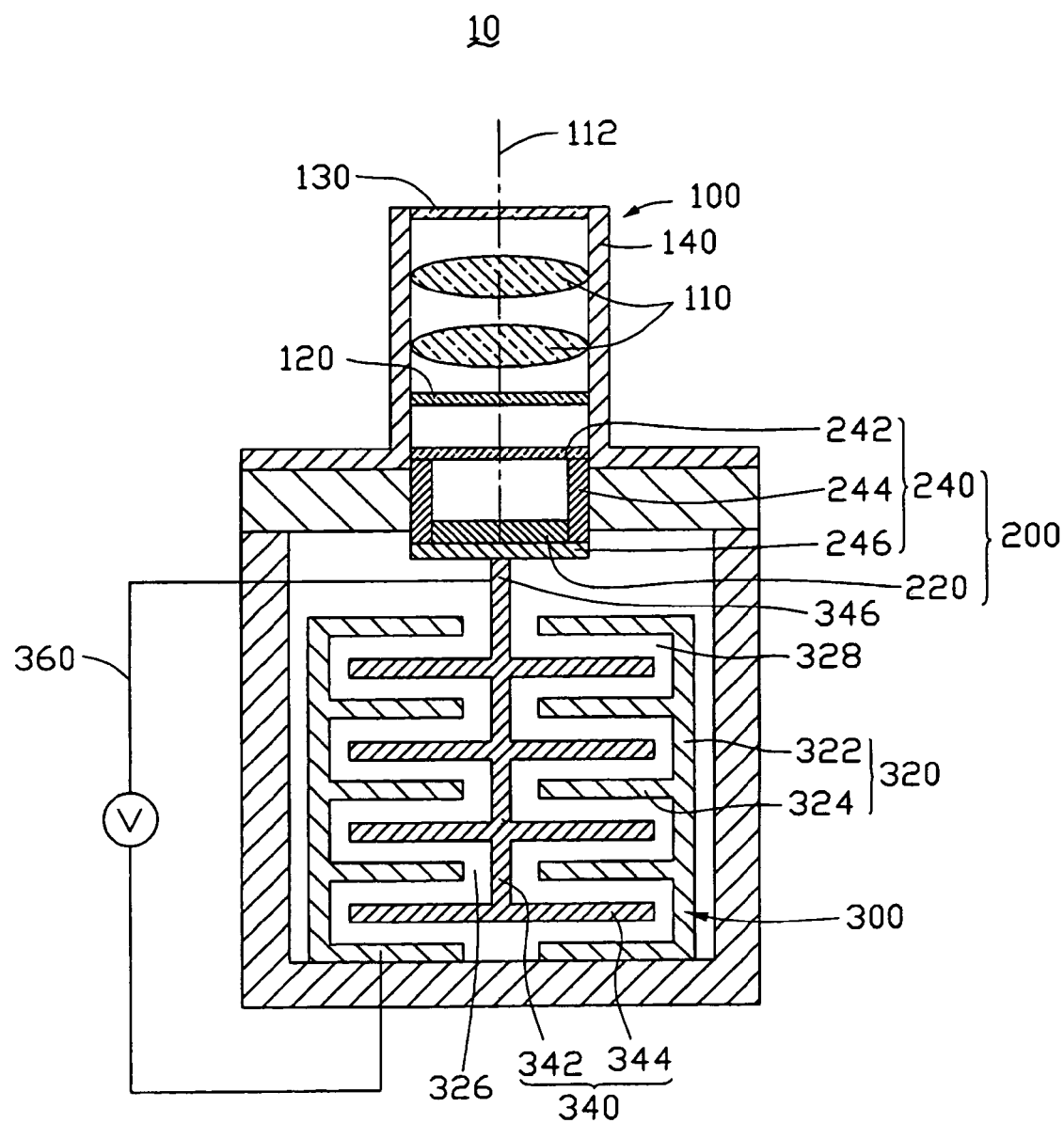
FIG. 1 is a schematic, cross-sectional view of a compact zoomable camera device according to an exemplary embodiment.

Corresponding reference characters indicate corresponding parts throughout the drawing. The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Reference will now be made to the drawing to describe the preferred embodiments of a present zoomable camera device in detail.

Referring to FIG. 1, there is shown a compact zoomable camera device 10 for a portable digital electronic device. The zoomable camera device 10 includes an optical system 100, an image sensor device 200, and a microelectronic mechanical system (MEMS) micro-actuator 300.

The optical system 100 is adapted for capturing images and focusing the images onto a focal plane thereof. The optical system 100 includes a lens system 110, an infrared cut filter 120, a protective plate 130, and a barrel 140. The lens system 110 includes at least two lenses that can be moved relative to each other, by which a focal distance of the lens system 110 can be adjusted. The lens system 110, the infrared filter 120, and the protective layer 130 are fixed by the barrel, by which the lenses of the lens system 110 are axially aligned. The lenses of the lens system 110 can be spherical lenses. However, aspheric lenses are more preferable, as they facilitate greater miniaturization of the lens system 110. Such lenses can be made of either glass or plastic materials.

The image sensor device 200 is designed to receive the images and convert the images into electronic signals. The image sensor device 200 includes an image sensor 220 and a housing 240 enclosing the image sensor 220 therein so as to protect the image sensor 220 from contamination. The housing 240 is composed of a transparent window 242, a sidewall 244, and a base 246. The image sensor 220 is disposed on the base 246 in axial alignment below the lens system 110, and is designed so as to move along an optical axis 112 of the lens system 110. The transparent window 242, the image sensor 220, the base 246, the infrared cut filter 120, the protective plate 130 and each lens of the lens system 110 are disposed substantially parallel to each other. The image sensor 220 can be a complementary metal-oxide semiconductor (CMOS) device or a charge coupled device (CCD).

The MEMS micro-actuator 300 is designed so as to move sensor 220 along the optical axis 112 of the lens system 110, dynamically positioning the image sensor 220 at the instant focal plane of the lens system 110. According to an embodiment of the present zoomable camera device 10, the MEMS micro-actuator 300 is made of a semiconductor material, such as single silicon. The MEMS micro-actuator 300 includes a stationary part 320, a movable part 340 and a power supply 360. The stationary part 320 and the movable part 340 are fabricated in a single crystal silicon reactive etching and metallization (SCREAM) process.

As shown in FIG. 1, the stationary part 320 includes a cylindrical sidewall 322, a plurality of layers of plates 324 extending from the sidewall 322 inwardly, each layer including at least one plate. The plates 324 define a channel 326 along a center axis of the micro-actuator 300. Each two adjacent layers of plates 324 define a gap 328 therebetween. The movable part 340 is received substantially in and is of a shape corresponding to the inner surface of the stationary part 320. The movable part 340 includes a shaft 342 received in the channel 326, and a plurality of torsional radial extensions 344 extending from the shaft 342 toward the sidewall 322 in the gaps 328. The channel 326 and the gaps 328 allow the movable part 340 to rotate along the axis of the shaft 342, and to move along the axis defined by the shaft 342. An end 346 of the shaft 342 extends outwardly through an opening in the stationary part 320 to connect with the base 246, so as to be capable of moving the image sensor 220 up and down along the optical axis 112 of the lens system 110. According to an embodiment of the present zoomable camera device 10, the lens system 110, the barrel 140, the stationary part 320, and the movable part 340 share a common axis.

The power supply 360 is coupled between the stationary part 320 and the movable part 340. The power supply 360 is either an alternating current (AC) power supply or a direct current (DC) power supply. The voltage provided by the power supply 360 is adjustable within a predetermined range, even from positive to negative and vice-versa.

When the power supply 360 applies a voltage between the stationary part 320 and the movable part 340. The movable part 340 oscillates at resonance frequencies in a high kHz range, thus exerting a torsional force which drives the movable part 320 to rotate relative to the stationary part 320 about their common axis. Accordingly, an attractive force develops between the plates 324 and the torsional radial extensions 344 to drive the movable part along the common axis.

Additionally, according to another embodiment of the present zoomable camera device 10, the zoomable camera device 10 further includes a position sensor 400 for detecting the exact position of the image sensor 220, thus generating a feed-back signal which controls the movement of the micro-actuator 300.

In operation, when the present zoomable camera device 10 is auto-focusing or zooming, the lens system 110 has its focal distance adjusted to the required length, therefore the focal plane of the lens system 110 also shifts accordingly. A distance from an original position of the image sensor 220 to the instant focal plane is then calculated. Instructed by the calculated distance, the micro-actuator then moves the image sensor 220 from the original position to the instant focal plane after the lens system 110 has been adjusted.

It is to be noted that although in the present zoomable camera device, the lens system 110, the stationary part 320 and the movable part 340 are all illustrated as sharing a common axis, other approaches relying on the same basic principle of the present invention are also feasible. For example, a reflective means can be employed between the lens system 110 and the image sensor 220 to change a light-converting path of the optical system 100, or one of other kinds of micro-actuators that are asymmetrical and whose stationary parts and movable parts share no common axis.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compact zoomable camera device comprising:
   an optical system for capturing an image of an object, the optical system comprising:
      a zoomable lens system having a plurality of lenses and defining an optical axis and a focal plane associated therewith;
      an image sensor device comprising an image sensor, positioned at the focal plane of the lens system; and
      a microelectronic mechanism system (MEMS) micro-actuator configured for moving the image sensor along the optical axis, so as to dynamically position the image sensor at the focal plane of the lens system.

2. The compact zoomable camera device as described in claim 1, further comprising a second sensor configured for detecting a position of the image sensor, and feeding a signal back to control the MEMS micro-actuator.

3. The compact zoomable camera device as described in claim 1, wherein the lens system comprises at least one aspheric lens.

4. The compact zoomable camera device as described in claim 3, wherein the aspheric lens is made of one of glass and a plastic material.

5. The compact zoomable camera device as described in claim 1, wherein the optical system further comprises an infrared cut filter, a protective plate, and a barrel, and the infrared cut filter and the protective plate are configured substantially parallel with the focal plane, and are received in the barrel.

6. The compact zoomable camera device as described in claim 1, wherein the image sensor device further comprises a housing enclosing the image sensor for protecting the image sensor from contamination.

7. The compact zoomable camera device as described in claim 6, wherein the housing comprises a transparent window, and a base, the image sensor being disposed on the base spatially corresponding to the lens system.

8. The compact zoomable camera device as described in claim 1, wherein the image sensor is one of a complementary metal-oxide semiconductor device and a charge coupled device.

9. The compact zoomable camera device as described in claim 1, wherein the MEMS micro-actuator comprises a stationary part, a movable part and a power supply.

10. The compact zoomable camera device as described in claim 9, wherein the stationary part and the movable part are fabricated by a single crystal silicon reactive etching and metallization (SCREAM) process.

11. The compact zoomable camera device as described in claim 9, wherein the stationary part comprises:
    a sidewall; and
    a plurality of layers of leaves extending from an inner surface of the sidewall inwardly, each layer comprising at least one leaf;
    wherein the leaves cooperatively define a channel along a center axis of the micro-actuator and every two adjacent layers of leaves define a gap.

12. The compact zoomable camera device as described in claim 11, wherein the movable part is received in the stationary part, the movable part comprising:
    a shaft received in the channel, the shaft being connected with the image sensor device; and
    a plurality of torsional radial extensions extending from the shaft toward the sidewall into the gaps.

13. The compact zoomable camera device as described in claim 9, wherein the power supply is coupled between the stationary part and the movable part.

14. The compact zoomable camera device as described in claim 13, wherein the power supply is configured for adjustably providing a voltage to the stationary part and the movable part.

15. The compact zoomable camera device as described in claim 14, wherein the power supply is a direct current power supply.

16. The compact zoomable camera device as described in claim 14, wherein the power supply is an alternating current power supply.

* * * * *

UNITED STATES PATENT AND TRADEMARK OFFICE
CERTIFICATE OF CORRECTION

PATENT NO. : 7,589,912 B2  
APPLICATION NO. : 11/377698  
DATED : September 15, 2009  
INVENTOR(S) : Ga-Lane Chen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Twenty-first Day of September, 2010

David J. Kappos  
*Director of the United States Patent and Trademark Office*